Nov. 10, 1925.
A. L. BEGG
1,561,399
SAFETY BELT FOR INFANTS
Filed Nov. 8, 1923
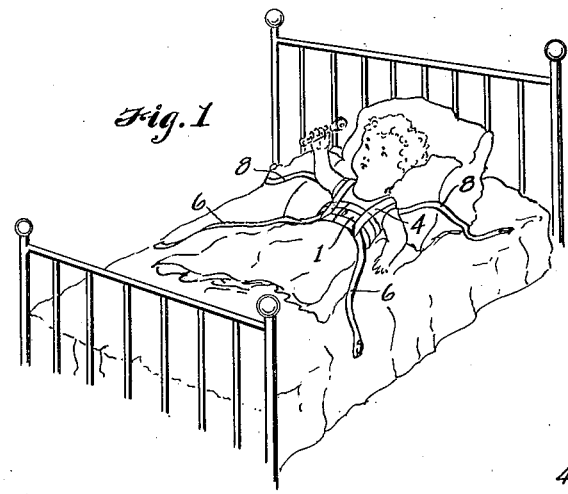
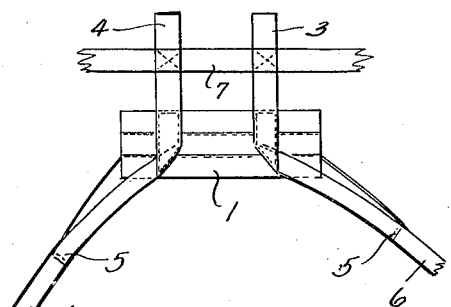
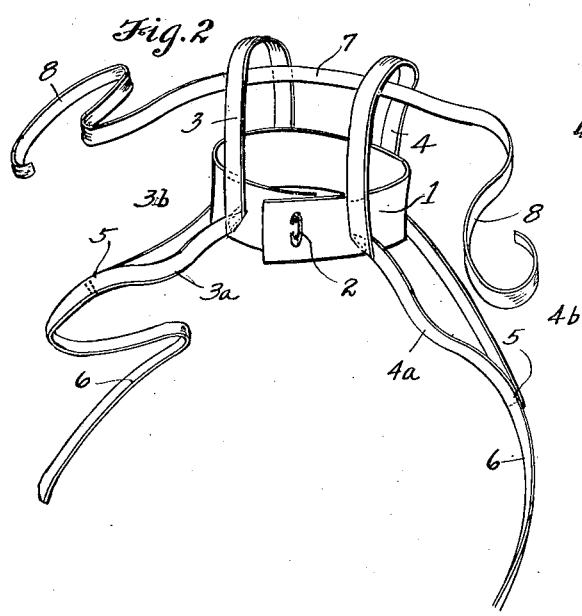
INVENTOR
ANNA L. BEGG
BY
Richard J. Cook
ATTORNEY Patented Nov. 10, 1925.

1,561,399

UNITED STATES PATENT OFFICE.

ANNA L. BEGG, OF SEATTLE, WASHINGTON.

SAFETY BELT FOR INFANTS.

Application filed November 8, 1923. Serial No. 673,479.

*To all whom it may concern:*

Be it known that I, ANNA L. BEGG, a citizen of the United States, and a resident of Seattle, King County, Washington, have invented certain new and useful Improvements in Safety Belts for Infants, of which the following is a specification.

This invention relates to safety belts for infants and has for its principal object to provide a belt of that character for preventing a baby from falling from its bed, or from tossing about so that it will become uncovered.

Another object of the invention is to provide a device of the above character, and for the above purposes, comprising a belt that may be secured about the baby's body and which has a plurality of retaining straps, or ties, extended therefrom which may be pinned, or otherwise fastened, to the bedding or bed.

In accomplishing these objects, I have provided the improved details of construction, the preferred forms of which are illustrated in the accompanying drawings, wherein—

Figure 1 is a perspective view, illustrating the application and use of a safety belt in accordance with the present invention.

Figure 2 is a perspective view of the belt.

Figure 3 is a back view of the belt and a part of the attaching straps.

Referring more in detail to the drawings—

1 designates a belt, or band, adapted to be applied about the baby's body in such manner that its ends may be secured by means of a pin 2, or other suitable fastening device. The belt is relatively wide and preferably would be made of a single piece of wide tape.

Secured to the forward and rearward sides of the belt are straps 3 and 4 adapted to be extended over the shoulders to support the belt properly in position. The forward and rearward end portions $3^a$ and $3^b$ of one strap and $4^a$ and $4^b$ of the other are extended from the lower edge of the belt and are joined together, as at 5, and one portion is continued to provide the tie straps 6 adapted to be secured by being pinned, or otherwise fastened, to the bedding or mattress.

The ends $3^a$ and $4^a$ are longer than the ends $3^b$ and $4^b$ in order that the tie straps 6 will not prevent the baby from turning from side to side.

A tie strap 7 is also extended across the shoulder portion at the back and is secured thereto, and which has extended end portions 8 adapted to be secured to the bed or bedding. With the device so constructed, and applied, as shown in Figure 1, it is possible to prevent the infant from rolling or crawling from the bed and at the same time permits necessary freedom of the turning of the baby on its side. The device also will prevent the baby tossing about and being uncovered. Such devices can be made in various sizes accordingly as required, and of materials that are suitable.

Having thus described my invention, what I claim as new therein, and desire to secure by Letters-Patent, is:

A device of the class described, comprising a relatively wide belt portion having ends adapted to secure it about the body, shoulder straps secured to the belt and attached to the belt at the front and back each with its end portions extended downwardly from the belt and joined together with one end portion extended considerably to provide tie straps at each side and a cross tie strap joining the shoulder straps in spaced relation across the back with its ends extended substantially at opposite sides.

Signed at Seattle, King County, Washington, this 29th day of October, 1923.

ANNA L. BEGG.